US008814657B2

(12) United States Patent
Englman et al.

(10) Patent No.: US 8,814,657 B2
(45) **Date of Patent: *Aug. 26, 2014**

(54) WAGERING GAME WITH RULE SET ALTERED PRIOR TO COMPLETION OF REEL SPIN

(75) Inventors: Allon G. Englman, Chicago, IL (US); Joel R. Jaffe, Glenview, IL (US); Jeremy M. Hornik, Chicago, IL (US); Larry J. Pacey, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/593,086

(22) Filed: Aug. 23, 2012

(65) Prior Publication Data

US 2012/0322535 A1 Dec. 20, 2012

Related U.S. Application Data

(63) Continuation of application No. 12/440,049, filed as application No. PCT/US2007/019756 on Sep. 10, 2007, now Pat. No. 8,272,944.

(60) Provisional application No. 60/843,656, filed on Sep. 11, 2006.

(51) Int. Cl.
*A63F 9/24* (2006.01)
*A63F 13/00* (2014.01)

(52) U.S. Cl.
USPC .................... 463/20; 463/22; 463/23; 463/31

(58) Field of Classification Search
USPC ..................................................... 463/20, 25
See application file for complete search history.

(56) References Cited

U.S. PATENT DOCUMENTS

| | | | | |
|---|---|---|---|---|
| 5,720,662 | A * | 2/1998 | Holmes et al. | 463/20 |
| 5,941,773 | A | 8/1999 | Harlick | 463/26 |
| 6,190,254 | B1 | 2/2001 | Bennett | 463/13 |
| 6,251,013 | B1 * | 6/2001 | Bennett | 463/13 |
| 6,336,863 | B1 * | 1/2002 | Baerlocher et al. | 463/27 |
| 6,676,512 | B2 | 1/2004 | Fong et al. | 463/20 |

(Continued)

FOREIGN PATENT DOCUMENTS

| | | | |
|---|---|---|---|
| JP | 2004-008302 | A | 1/2004 |
| JP | 2004008302 | A * | 1/2004 |

(Continued)

OTHER PUBLICATIONS

PCT International Search Report for International Application No. PCT/US2007/019756 dated Sep. 17, 2008 (2 pages).

(Continued)

*Primary Examiner* — Steven J Hylinski
(74) *Attorney, Agent, or Firm* — Nixon & Peabody LLP

(57) ABSTRACT

A gaming machine for playing a wagering game includes a display and a controller. The display displays a plurality of spinning reels that stop to indicate a randomly selected outcome of a plurality of outcomes in response to accepting a wager input from a player. The controller is in communication with the display and is operative to conduct the wagering game in accordance with a basic set of gaming rules. The controller is further operative to cause a modification to a gaming rule of the basic set of gaming rules and to indicate the modification to the player.

13 Claims, 14 Drawing Sheets

(56) References Cited

U.S. PATENT DOCUMENTS

| | | | | |
|---|---|---|---|---|
| 6,942,568 | B2 * | 9/2005 | Baerlocher | 463/16 |
| 7,347,777 | B2 * | 3/2008 | Gauselmann | 463/25 |
| 7,396,279 | B2 | 7/2008 | Berman et al. | 463/16 |
| 7,789,756 | B2 | 9/2010 | Jones et al. | 463/37 |
| 8,226,461 | B2 * | 7/2012 | Gauselmann | 463/16 |
| 8,272,944 | B2 * | 9/2012 | Englman et al. | 463/21 |
| 2002/0160830 | A1 | 10/2002 | Stern | 463/20 |
| 2004/0053673 | A1 * | 3/2004 | Mishra | 463/20 |
| 2004/0053685 | A1 | 3/2004 | Seelig et al. | 463/25 |
| 2004/0092299 | A1 * | 5/2004 | Gauselmann | 463/16 |
| 2005/0181861 | A1 * | 8/2005 | Kodachi | 463/20 |
| 2006/0058097 | A1 * | 3/2006 | Berman et al. | 463/20 |
| 2006/0063583 | A1 | 3/2006 | Thomas | 463/20 |
| 2006/0116194 | A1 | 6/2006 | Pacey et al. | 463/20 |
| 2006/0121978 | A1 | 6/2006 | Hornik et al. | 463/20 |
| 2006/0148553 | A1 * | 7/2006 | Dodge | 463/20 |
| 2006/0281525 | A1 | 12/2006 | Borissov | 463/20 |
| 2008/0102923 | A1 * | 5/2008 | Esses et al. | 463/20 |
| 2008/0214292 | A1 | 9/2008 | Bryant et al. | 463/25 |

FOREIGN PATENT DOCUMENTS

| | | | |
|---|---|---|---|
| JP | 2004-097686 A | 4/2004 | |
| WO | WO 0032286 | 6/2000 | A63F 9/22 |
| WO | WO 2007040674 | 4/2007 | A63F 9/24 |

OTHER PUBLICATIONS

PCT Written Opinion for International Application No. PCT/US2007/019756 dated Sep. 17, 2008 (3 pages).

Examiner's First Report in Australian Patent Application No. 2007294841 dated Jul. 20, 2011 (2 pages).

* cited by examiner

WAGERING GAME WITH RULE SET ALTERED PRIOR TO COMPLETION OF REEL SPIN

CROSS REFERENCE TO RELATED APPLICATIONS

This application is a continuation of U.S. patent application Ser. No. 12/440,049, titled "Wagering Game With Rule Set Altered Prior To Completion Of Reel Spin," filed Mar. 5, 2009, now allowed, which is a U.S. national stage of International Application No. PCT/US2007/019756, titled "Wagering Game With Rule Set Altered Prior To Completion Of Reel Spin," filed Sep. 10, 2007, which is related to and claims priority to U.S. Provisional Application No. 60/843,656, titled "Wagering Game With Rule Set Altered Prior To Completion Of Reel Spin," filed Sep. 11, 2006, each of which is incorporated herein its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a wagering game in which a rule set is altered before completing a reel spin.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

When playing a slots gaming machine, the player spins the reels and, after the reels have stopped spinning, the player views a randomly selected outcome that may include a gaming rule change. For example, after the reels have stopped spinning the player may be notified that, in addition to achieving a particular symbol combination, all the cherry symbols are being upgraded to wild symbols. One problem associated with indicating the gaming rule change after the reels have stopped spinning is that it fails to create a sense of anticipation and excitement for the player. Another problem associated with current gaming rule changes is that they are dependent on the randomly selected outcome. In other words, referring to the above example, all the cherry symbols are upgraded to wild symbols only if a particular combination of cherries is achieved (e.g., one cherry symbol lands in each reel).

Thus, a need exists for a gaming machine in which gaming rule changes are presented prior to indicating a completed reel spin. Another need exists for determining a rule change independently of a randomly selected outcome. The present invention is directed to satisfying one or more of these needs and solving other problems.

SUMMARY OF THE INVENTION

According to one aspect of the present invention, a gaming machine for playing a wagering game includes a display and a controller. The display displays a plurality of spinning reels that stop to indicate a randomly selected outcome of a plurality of outcomes in response to accepting a wager input from a player. The controller is in communication with the display and is operative to conduct the wagering game in accordance with a basic set of gaming rules. The controller is further operative to cause a modification to a gaming rule of the basic set of gaming rules and to indicate the modification to the player.

According to another aspect of the invention, a method of playing a wagering game includes receiving a wager input from a player for playing the wagering game and selecting a randomly selected outcome of a plurality of outcomes. The method further includes moving and stopping a plurality of reels to indicate the randomly selected outcome and conducting the wagering game in accordance with a basic set of gaming rules. Prior to stopping all of the plurality of reels, a modification is indicated to at least one gaming rule of the basic set of gaming rules.

According to yet another aspect of the invention, a method of conducting a wagering game on a gaming machine includes receiving a wager input from a player for conducting the wagering game and selecting a randomly selected outcome of a plurality of outcomes, the randomly selected outcome being selected in accordance with one or more basic rules of the wagering game. The method further includes displaying symbols arranged in a symbol array to indicate the randomly selected outcome and determining a modification to at least one of the basic rules. A representation of the modification is indicated before all the symbols of the symbol array are displayed, and an award is awarded in accordance with the modification.

According to yet another aspect of the invention, a computer readable storage medium is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
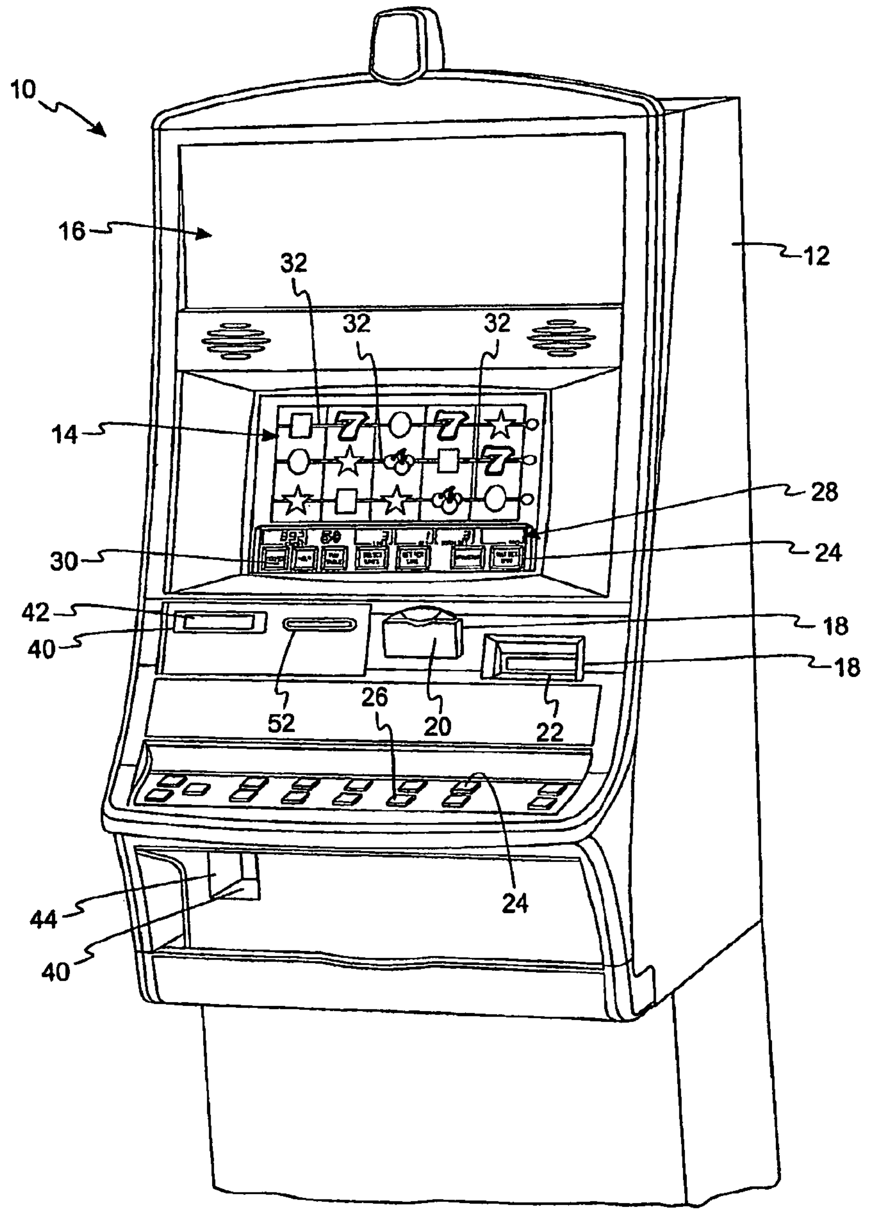
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
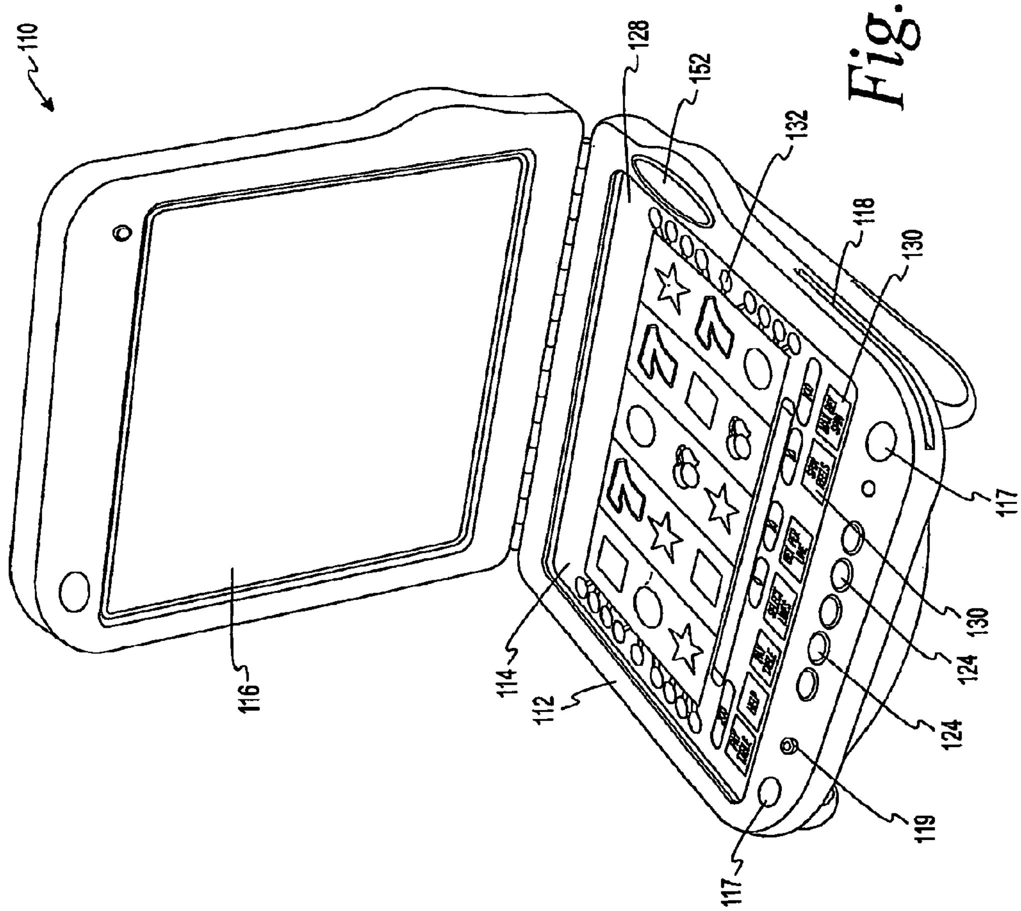
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds.

In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2"-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
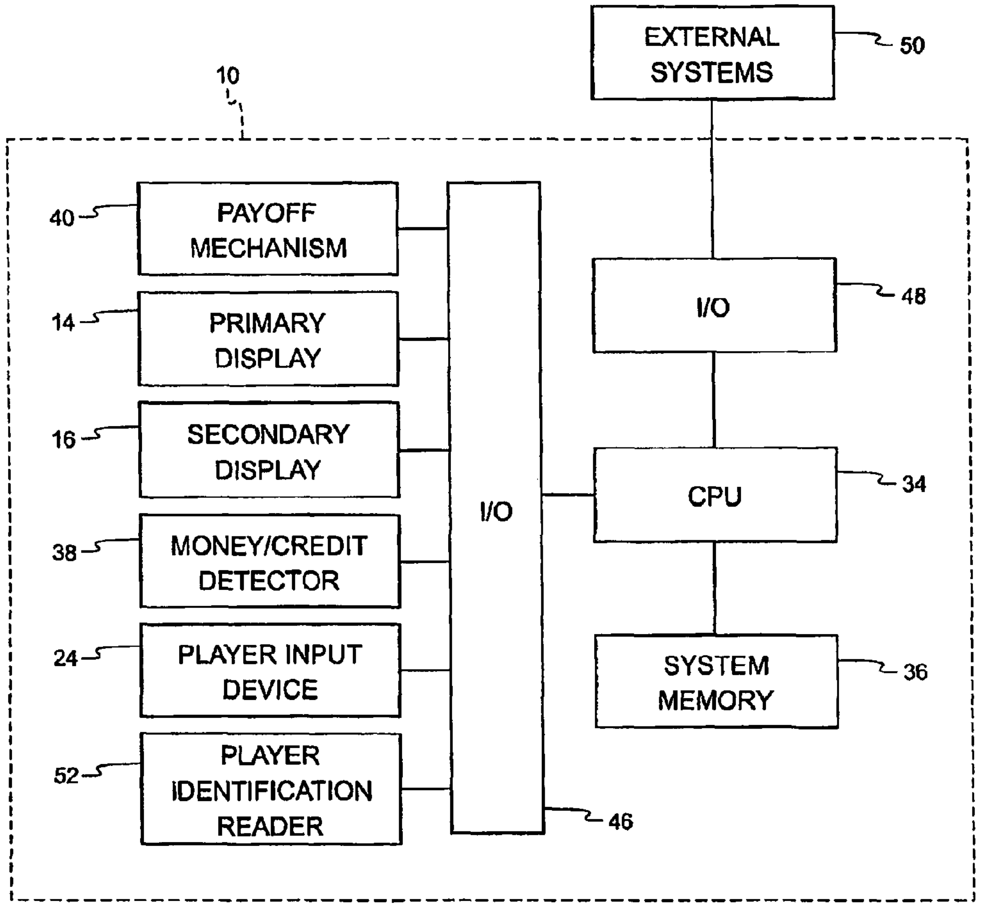
FIG. 2 is a block diagram of a control system suitable for operating the gaming machines of FIGS. 1*a* and 1*b*.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10 bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10, 110 may communicate with external systems 50 (in a wired or wireless manner) such that each machine operates as a "thin client," having relatively less functionality, a "thick client," having relatively more functionality, or through any range of functionality therebetween. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10, 110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

The wagering game played on the gaming machine 10, 110 is conducted in accordance with basic gaming rules that are familiar to a typical player. For example, the player may play a slots game in which the basic gaming rules provide a slots game that is played via five spinning reels. The player may conduct a slots game in which the randomly selected outcome is indicated via a plurality of predetermined symbols, such as cherry, lemon, orange, apple, and banana symbols. The player may conduct a slots game in which winning combinations are indicated to the player in a paytable, and in which the player can select a maximum of ten left-to-right paylines. Thus, before playing the slots game, the player has a general expectancy that the slots game will be played according to the respective set of basic gaming rules.

The player's anticipation and excitement in playing the slots game is likely increased by modifying the basic gaming rules prior to stopping of the reels. Accordingly, the player is presented with a positive rule-change modification prior to stopping the spinning motion of the reels. In contrast, presenting the rule-change modification after the reels stop spinning fails to provide a time period during the player waits eagerly for a perceived higher likelihood of receiving a greater award. In fact, presenting the rule-change modification after the reels stop spinning may confuse or annoy the player especially if the rule-change modification does not result in a winning combination.

Preferably, the rule-change modification is selected independent of the randomly selected reel spin outcomes. Further, the independent selection of the rule-change modification is preferably selected by an RNG dedicated to this function, in addition to the RNG that is used for selecting the randomly selected outcomes, or by a common RNG that is also used for selecting the reel spin outcomes.

Figure 3A:
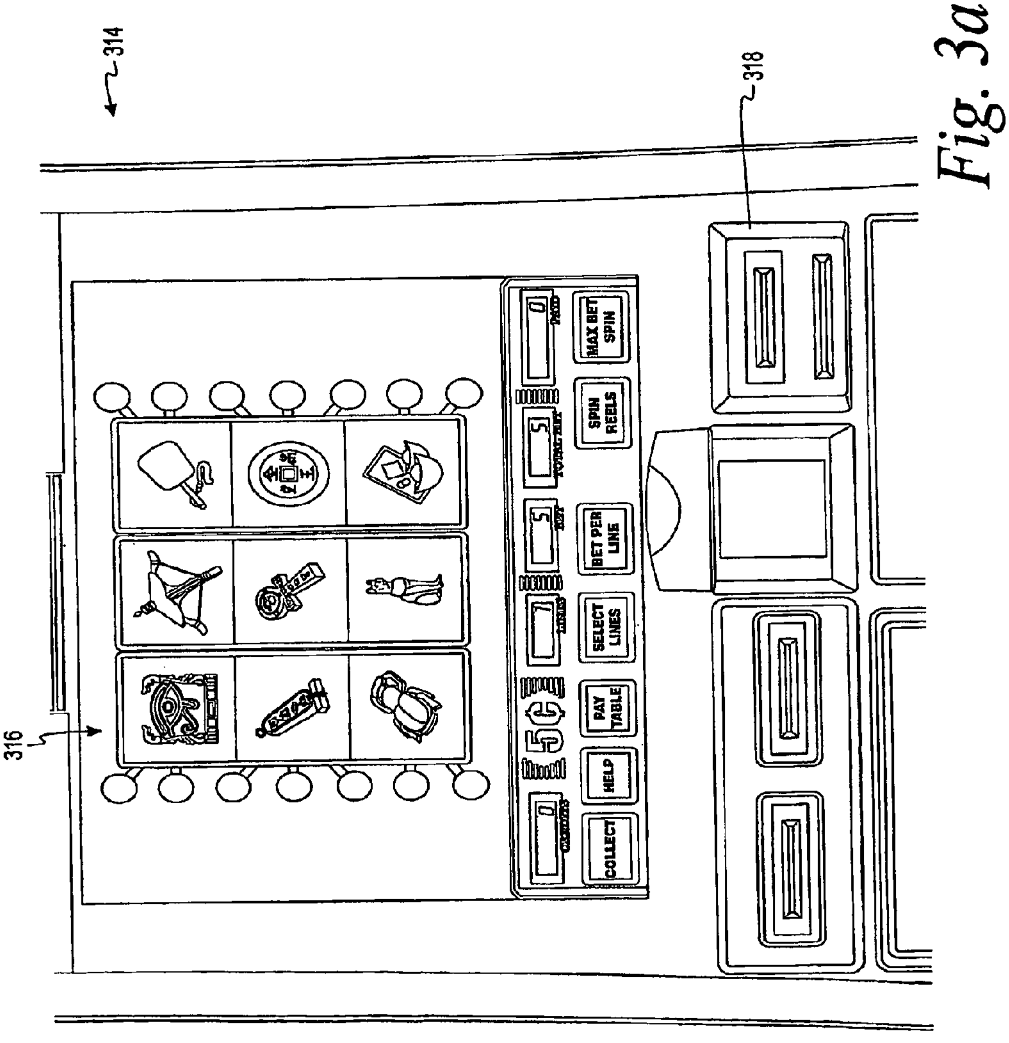
FIG. 3*a* is a front view of a display of the gaming machine showing a plurality of reels, according to one embodiment of the present invention.
Figure 3B:
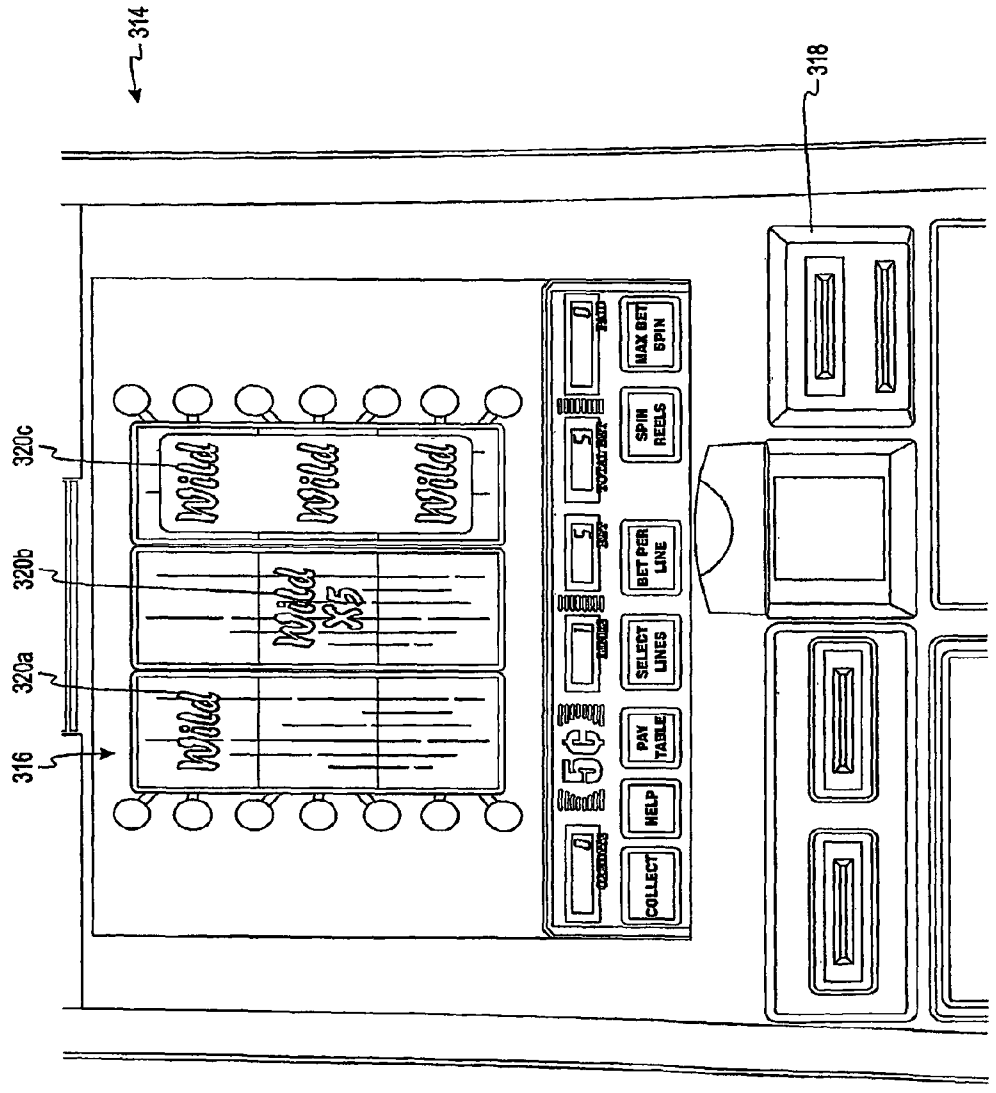
FIG. 3*b* is a representation of the plurality of reels of FIG. 3*a* in a spinning motion and including an indication of a rule-change modification, according to an alternative embodiment of the present invention.
Figure 3C:
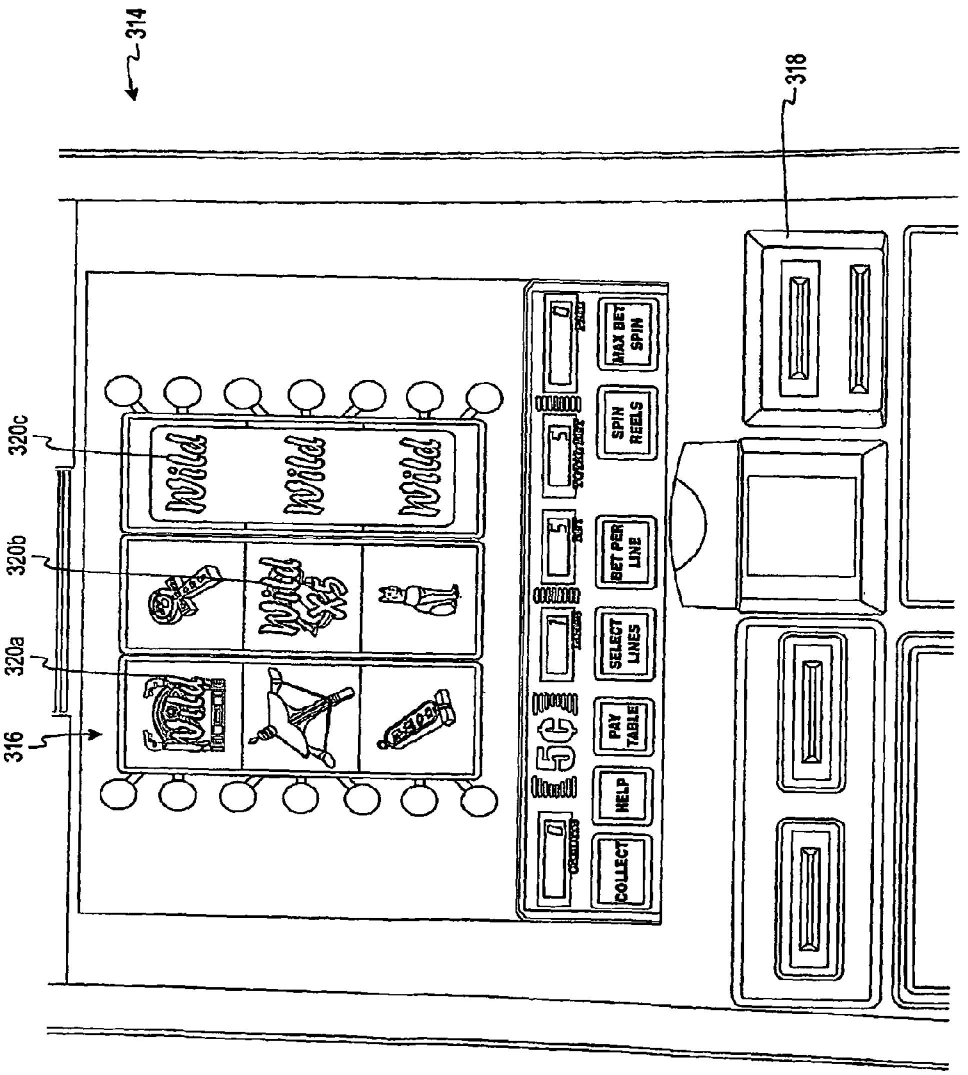
FIG. 3*c* is a representation of the plurality of reels of FIG. 3*b* after the spinning motion has stopped, according to an alternative embodiment of the present invention.

Referring to FIGS. 3*a*-3*c*, a display 314 of a gaming machine 300, similar to the gaming machine 10 described above, includes a plurality of reels 316 and a value input device 318. In FIG. 3*a*, the reels 316 are placed in motion after the player inserts a number of credits in the value input device 318. The spinning motion includes a simulated motion when the reels 316 are displayed on a video display. The gaming machine 300 is used for playing a wagering game that is a base game.

In FIG. 3*b*, following a player input to initiate a game, the reels 316 are now illustrated as they are spinning. While the reels 316 are spinning, the display 314 indicates to the player that a number of rule-change modifications 320 have occurred. The rule-change modifications 320 are indicated using a visual indication and/or an audio indication. The rule-change modifications 320 are preferably selected independently from randomly selected outcomes of the slots game. The rule-change modifications 320 include a wild position modification 320*a*, a wild position and multiplier modification 320*b*, and a wild reel modification 320*c*.

The wild position modification 320*a* indicates that one or more positions on the reels 316 are designated as wild positions. Accordingly, regardless of the symbol landing in the respective position, the wagering game now includes one or more wild positions as indicated by the wild position modification 320*a*. The indication of the wild position modification 320*a* will most likely increase the player's level of excitement who will now root for particular symbols to land near the designated wild positions.

The wild position and multiplier modification 320*b* indicates that one or more positions on the reels 316 is designated as a 5× multiplier position, in addition to a wild position. If the designated position is used to achieve a winning combination of symbols, a regular award is increased to an amount that is five times larger than the regular award. Thus, the player is likely excited about the rule change because he or she has received an enhanced symbol (i.e., the wild symbol position) and an award increaser (i.e., the 5× multiplier). Alternatively, the position designated by the wild position and multiplier modification 320*b* becomes a wild position with an associated multiplier only if a wild symbol lands in the position. Thus, the player is now rooting for a wild symbol to land in the designated position to receive a wild and multiplier modification.

The wild reel modification 320*c* is similar to the wild position modification 318*a* except that instead of a single position an entire reel is designated as being wild, e.g., a wild symbol expands to fill entirely the respective reel. Thus, as the reels 316 are spinning, the player is most likely rooting for particular symbols to land near the designated wild reel so that winning combinations of symbols are achieved.

Optionally, in addition to the visual designation of the rule-change modifications 320 the player will also be notified using an audio indication as the reels 316 are spinning. For example, an audio sound is played prior to displaying the rule-change modifications 320 to further enhance the excitement level of the player. When the player hears the audio sound, he or she will likely be excited that a rule-change modification 320 is about to be indicated.

In another example, video images and audio sounds are indicated generally simultaneously with the displaying of the rule-change modifications 320 to further emphasize that the player is now playing with at least one changed rule. Note that other positive "rule changes" are possible and will not necessarily appear in groups, as shown in FIG. 3*c*. In an alternative embodiment, the rule-change modifications may be presented after the player input to initiate a play of the game, but before the reels 316 actually spin.

In FIG. 3*c*, the reels 316 are now displayed after they have stopped spinning. Based on the rule changes, as indicated by the rule-change modifications 320, the player may have achieved a number of winning combinations. Optionally, the player is allowed to see the symbol that would have landed in a particular position if the respective rule-change modification had not occurred. For example, the player is able to see that the wild position rule-change modification 320*a* has replaced an "evil eye" symbol. Assuming that the "evil eye" symbol would not provide the player with a winning combination, the player will likely be excited that the wild position rule-change modification 320*a* has occurred. A transparent or translucent image of the rule-change modifications 320 is used to show the underlying symbol along with the rule-change modifications 320.

Figure 4:
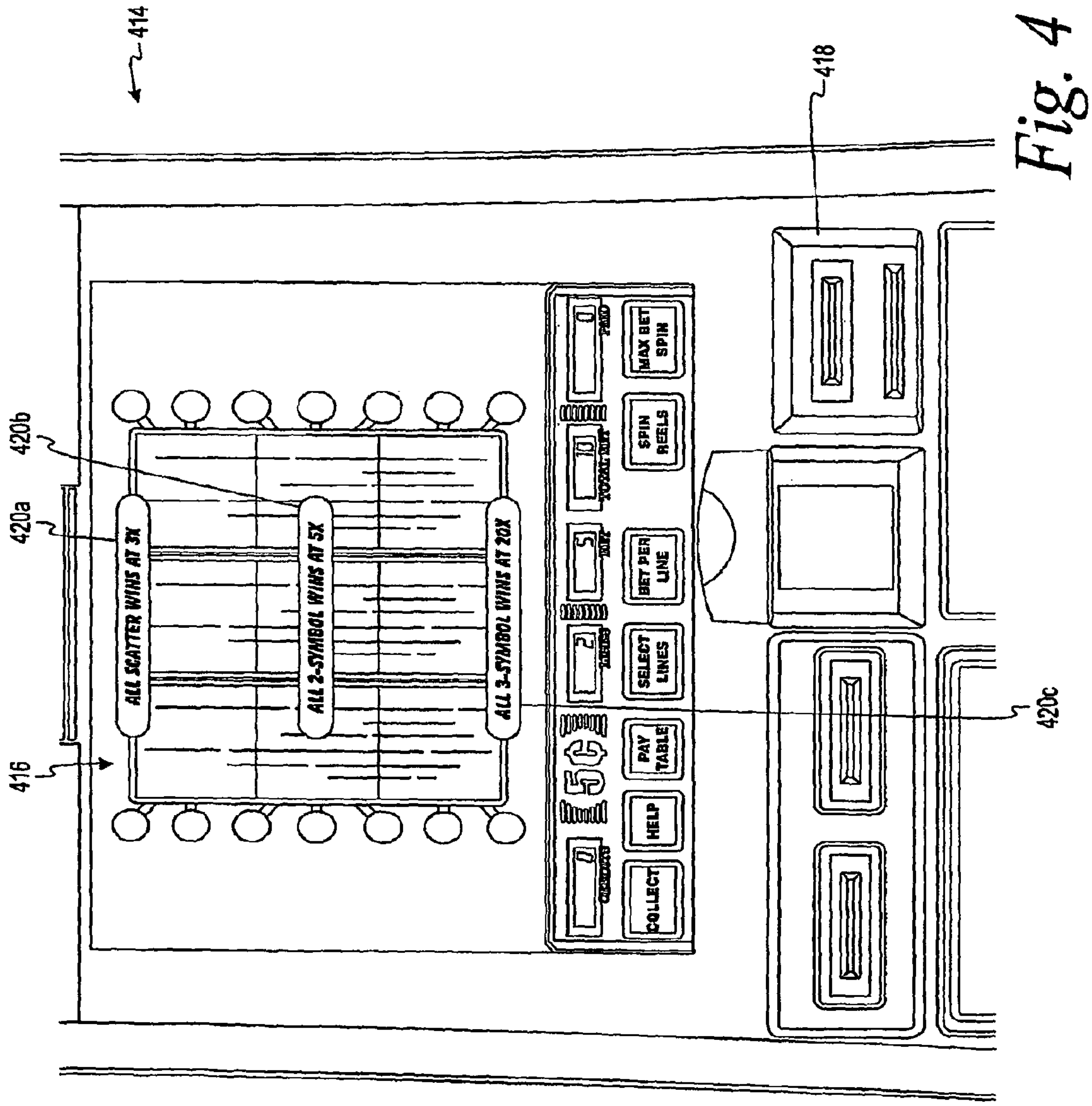
FIG. 4 is a front view of a display of the gaming machine indicating a plurality of rule-change modifications during a spinning motion of a plurality of reels, according to an alternative embodiment of the present invention.

Referring to FIG. 4, a display 414 of a gaming machine 400, similar to the gaming machine 10 described above, includes a plurality of reels 416 and a value input device 418. The reels 416 are displayed while they are spinning, after the player has inserted a number of credits in the value input device 418. While the reels 416 are spinning, the display 414 indicates to the player that a number of rule-change modifications 420 have occurred. The rule-change modifications 420 include an All Scatter Wins At 3× modification 420*a*, an All 2-Symbol Wins At 5× modification 420*b*, and an All 3-Symbol Wins At 20× modification 420*c*. Thus, the multiplier is based on the number of winning symbols in a winning combination. Each rule-change modification 418 indicates that, after the reels stop spinning, any winning combination of the respective number of symbol combinations receives a respective award increase. For example, according to the All 3-Symbol Wins At 3× modification 420*a*, a winning combination that includes three winning symbols pays an award that is three times larger than the regular award (which is the award that the player would have received if the rule-change modification 420*a* had not occurred). As such, the player roots for a winning combination that contains as many winning symbols as possible, e.g., a winning combination that contains five symbols.

Figure 5:
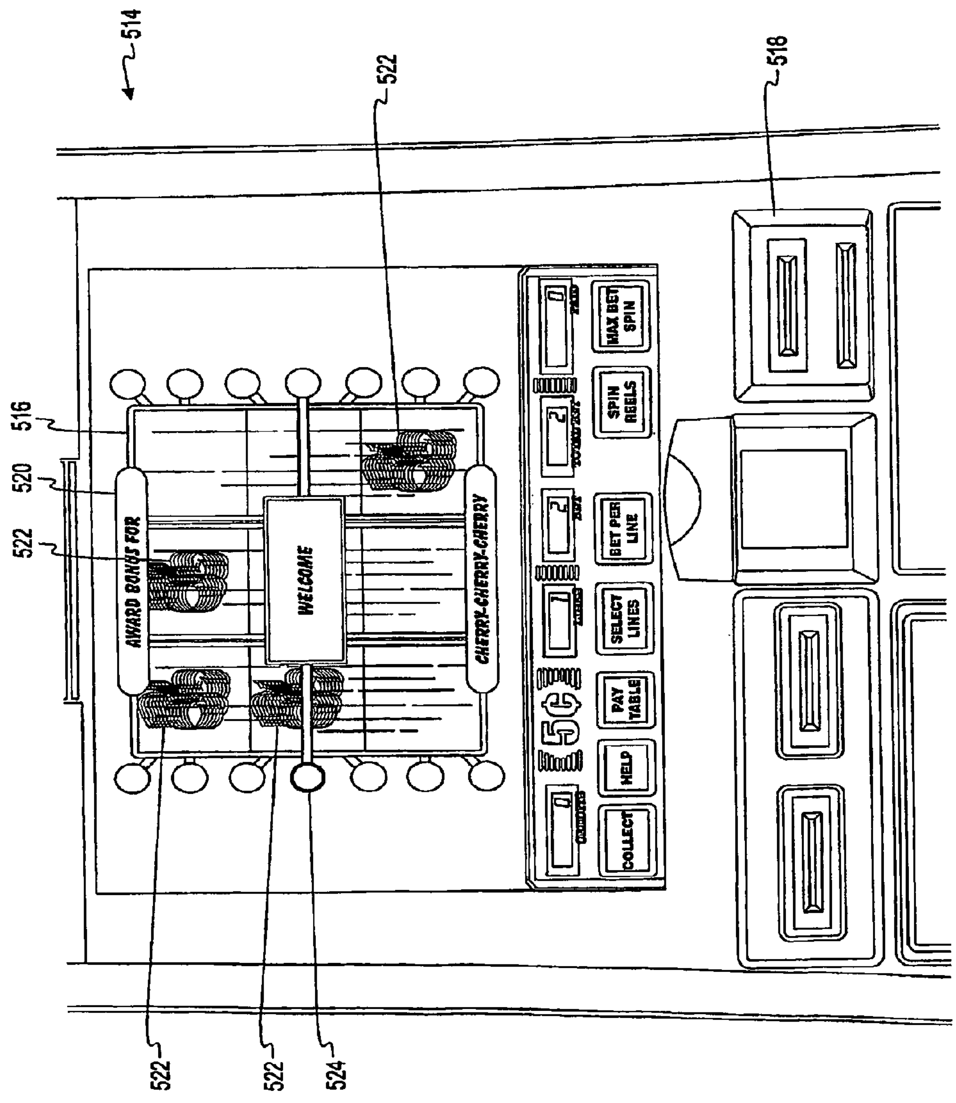
FIG. 5 is a front view of a display of the gaming machine indicating a rule-change modification before a spinning motion of a plurality of reels, according to an alternative embodiment of the present invention.

Referring to FIG. 5, a display 514 of a gaming machine 500, similar to the gaming machine 10 described above, includes a plurality of reels 516 and a value input device 518. After the player has inserted a wager in the input device 518, and before the reels 516 start spinning, the display 514 indicates a rule-change modification 520 in which a bonus will be awarded to the player if he or she receives a Cherry-Cherry-Cherry symbol combination. Thus, the player is excited to receive the modification 520 because he or she is likely to receive an award for a symbol combination that previously was not a winning combination. As the reels 516 are spinning, the player gets excited every time a cherry symbol 522 spins past a selected payline 524 in the hope that the symbol modification will result in a bonus award. In an alternative embodiment, the modification 520 changes a winning combination into a bonus triggering combination.

Figure 6:
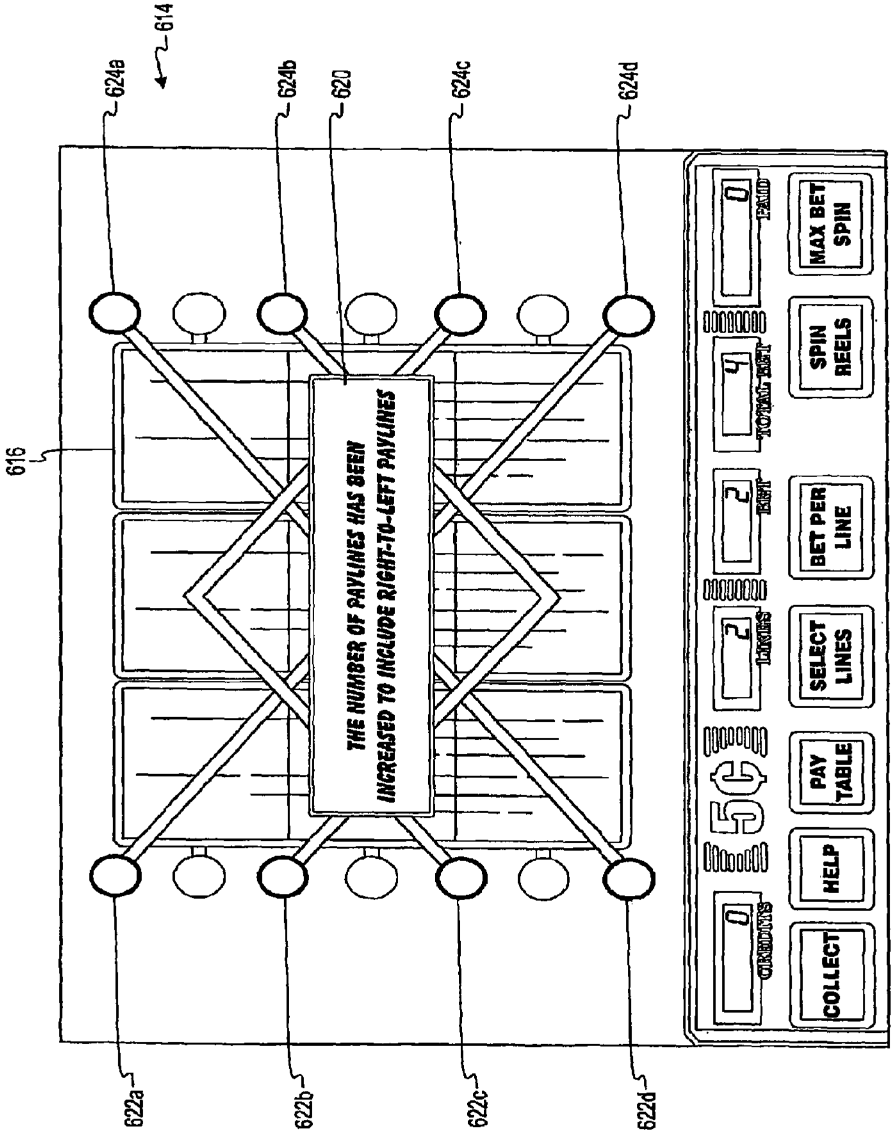
FIG. 6 is a front view of a display of the gaming machine in which a plurality of payline is added as a rule-change modification, according to an alternative embodiment of the present invention.

Referring to FIG. 6, a display 614 of a gaming machine 600, similar to the gaming machine 10 described above, includes a plurality of reels 616 and a rule-change modification 620 that increases a number of standard left-to-right paylines 622*a*-622*d*. The modification 620, which is indicated while the reels 616 are spinning, provides the player with an additional number of right-to-left paylines 624*a*-624*d*. The player can be given the option to wager on the additionally provided right-to-left paylines 624*a*-624*d*. Alternatively, the right-to-left paylines 624*a*-624*d* are provided to the player as active paylines at no cost. Thus, if a winning combination lands on any of the right-to-left paylines 624*a*-624*d* the player receives the corresponding award.

Figure 7:
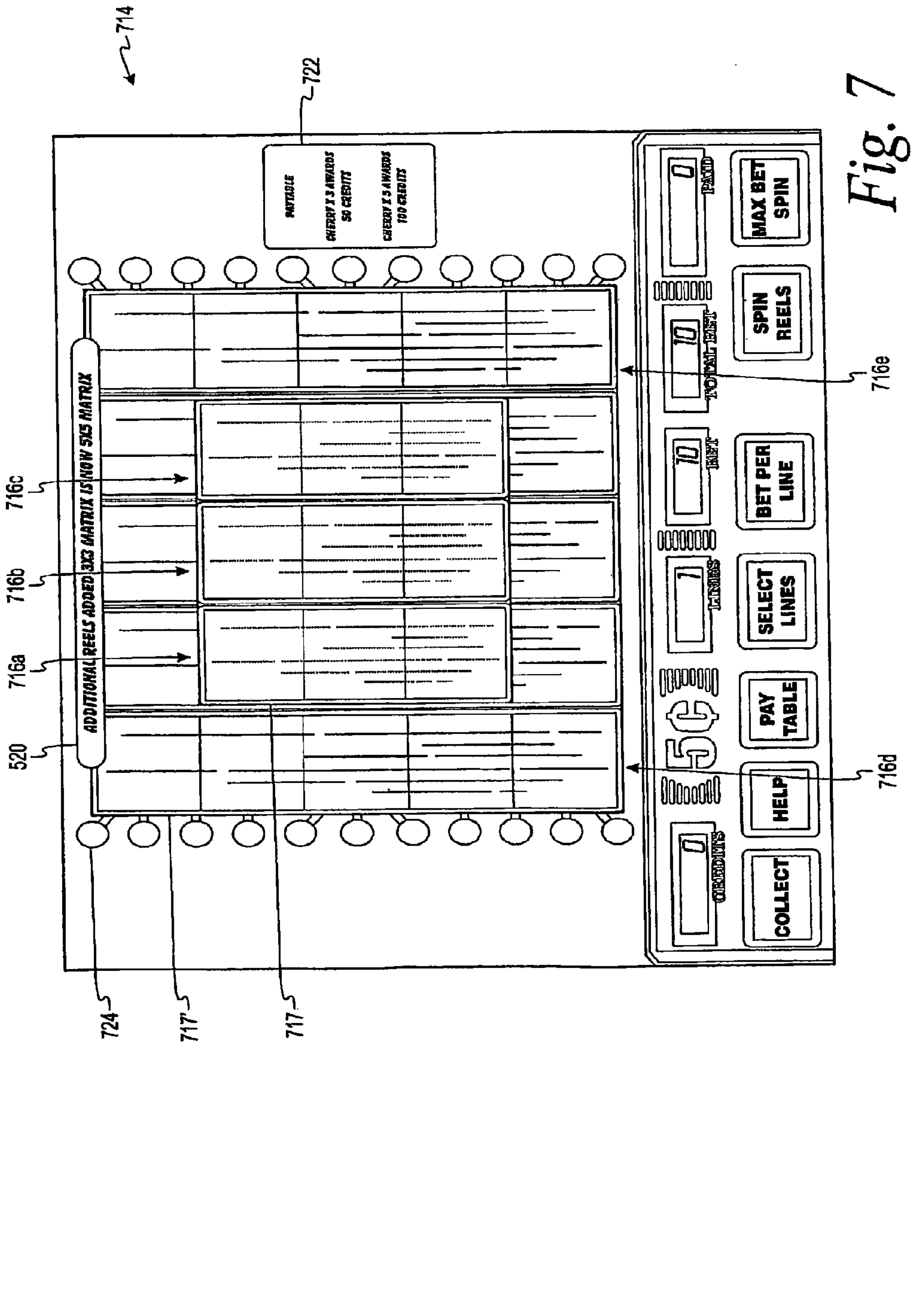
FIG. 7 is a front view of a display of the gaming machine in which a reel array is modified, according to an alternative embodiment of the present invention.

Referring to FIG. 7, a display 714 of a gaming machine 700, similar to the gaming machine 10 described above, includes a plurality of reels 716 and a rule-change modification 720. Each reel 716 has a top, middle, and bottom position for aligning three respective symbols when the reels stop spinning. The reels 716 include a first reel 716*a*, a second reel 716*b*, and a third reel 716*c*. Thus, the reels 716 form a three-by-three matrix 717 that includes three lines and three reels. The rule-change modification 720 indicates to the player that additional reels are added such that the three-by-three matrix 717 of the reels 716 is now a five-by-five matrix 717'. Specifically, a fourth reel 716*d* and a fifth reel 716*e* have been added so that the original three-by-three matrix 717 now includes five reels 716. Further, two additional positions have been added to each reel 716 so that the original three-by-three matrix 717 now includes five positions. Thus, the original three-by-three matrix 717 is now converted to a five-by-five matrix 717', which has more paylines 724. The player is now anticipating winning combinations that could not be achieved with the basic three-by-three matrix 716. Further, the player can now anticipate winning combinations that provide a better chance of winning matching-symbol combinations (e.g., cherry-cherry-cherry), including five matching symbols. For example, a paytable 722 indicates that "Cherry×5 Awards 100 Credits."

According to an alternative embodiment, the original matrix 716 is a three-by-five matrix 717 that includes five reels with three rows (i.e., each reel includes a top, center, and bottom position on the display). If the player randomly receives a rule-change modification, the three-by-five matrix is rotated ninety degrees such that the original matrix 716 is now a five-by-three matrix that includes five lines and three reels. Two additional reels may be added to complete the transition from the original matrix 716 of three-by-five to a modified matrix 716' of five-by-five. In this embodiment, the rows are now converted to reels so that the reels spin in a vertical direction, or, alternatively, the reels now spin in a horizontal (or sideways) direction.

Figure 8A:
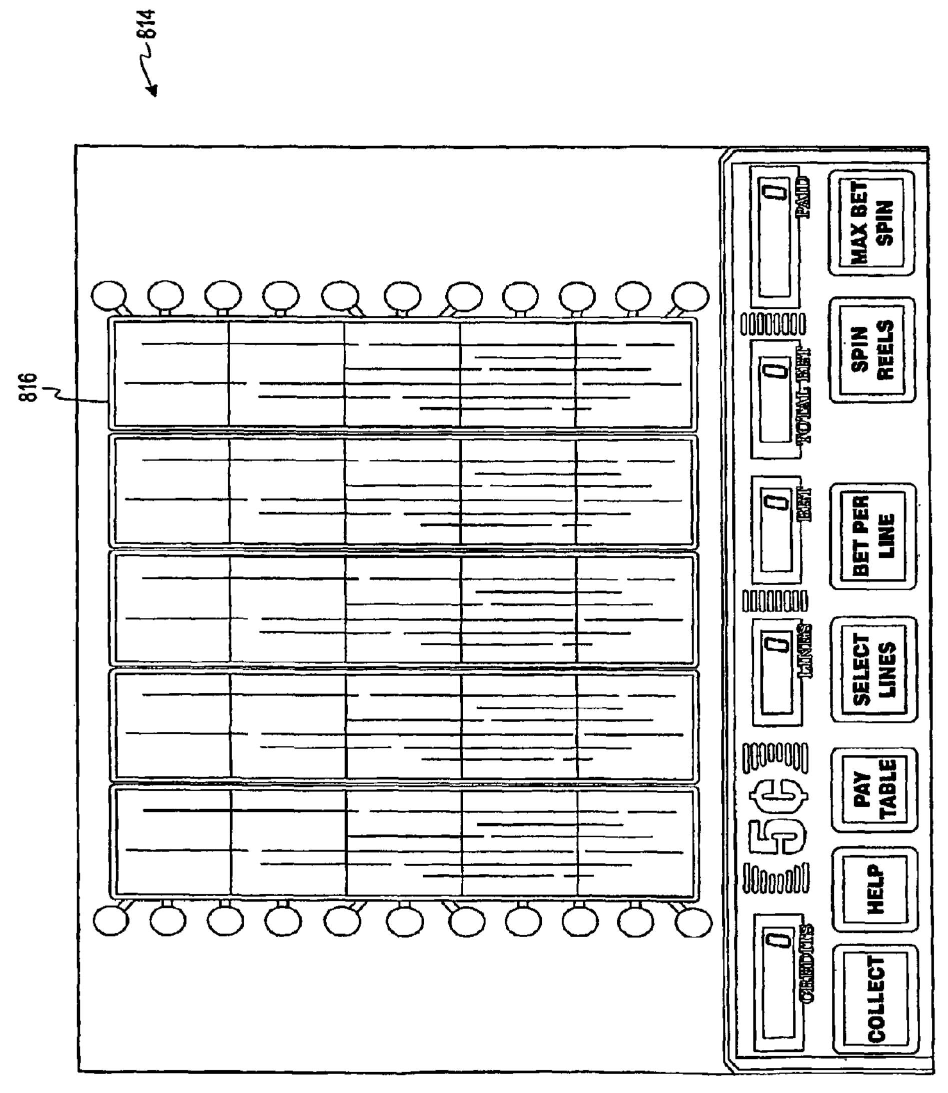
FIG. 8*a* is a front view of a display of the gaming machine showing a plurality of spinning reels, according to an alternative embodiment of the present invention.
Figure 8B:
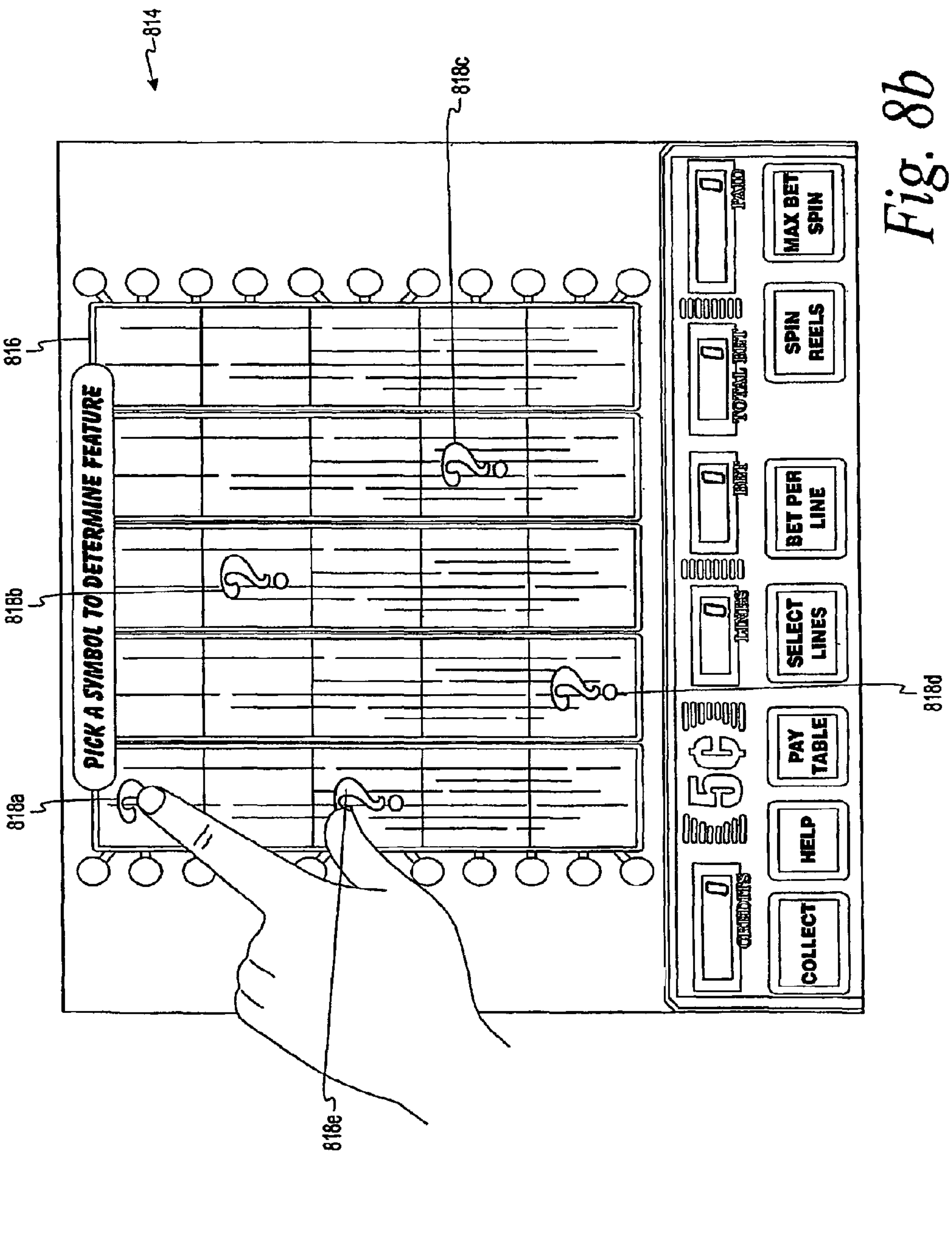
FIG. 8*b* shows the display of FIG. 8*a* in which a plurality of mystery symbols are presented to a player while the reels are spinning.
Figure 8C:
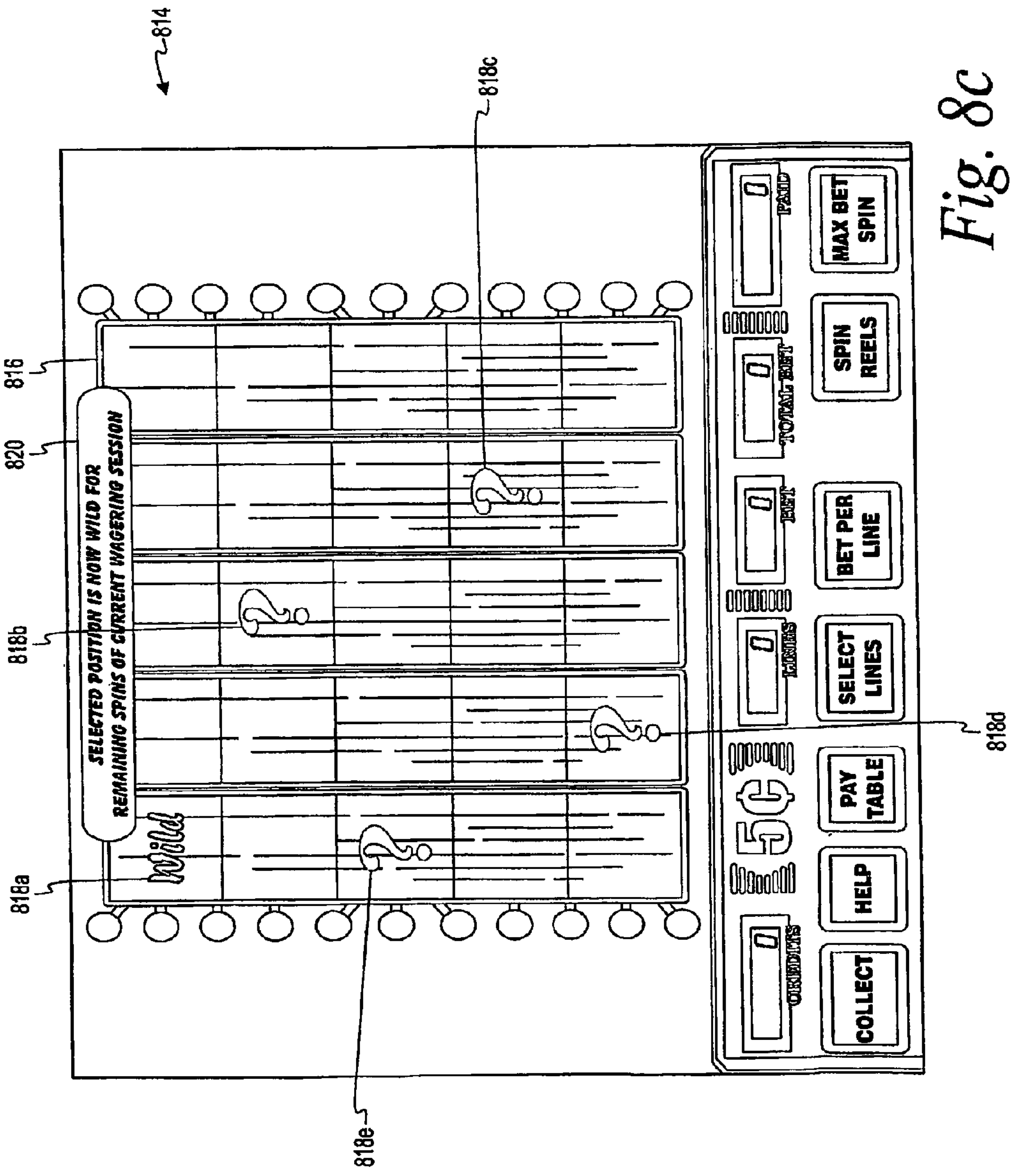
FIG. 8*c* shows the display of FIG. 8*b* in which a rule-change modification is indicated to the player based on a player selection.
Figure 8D:
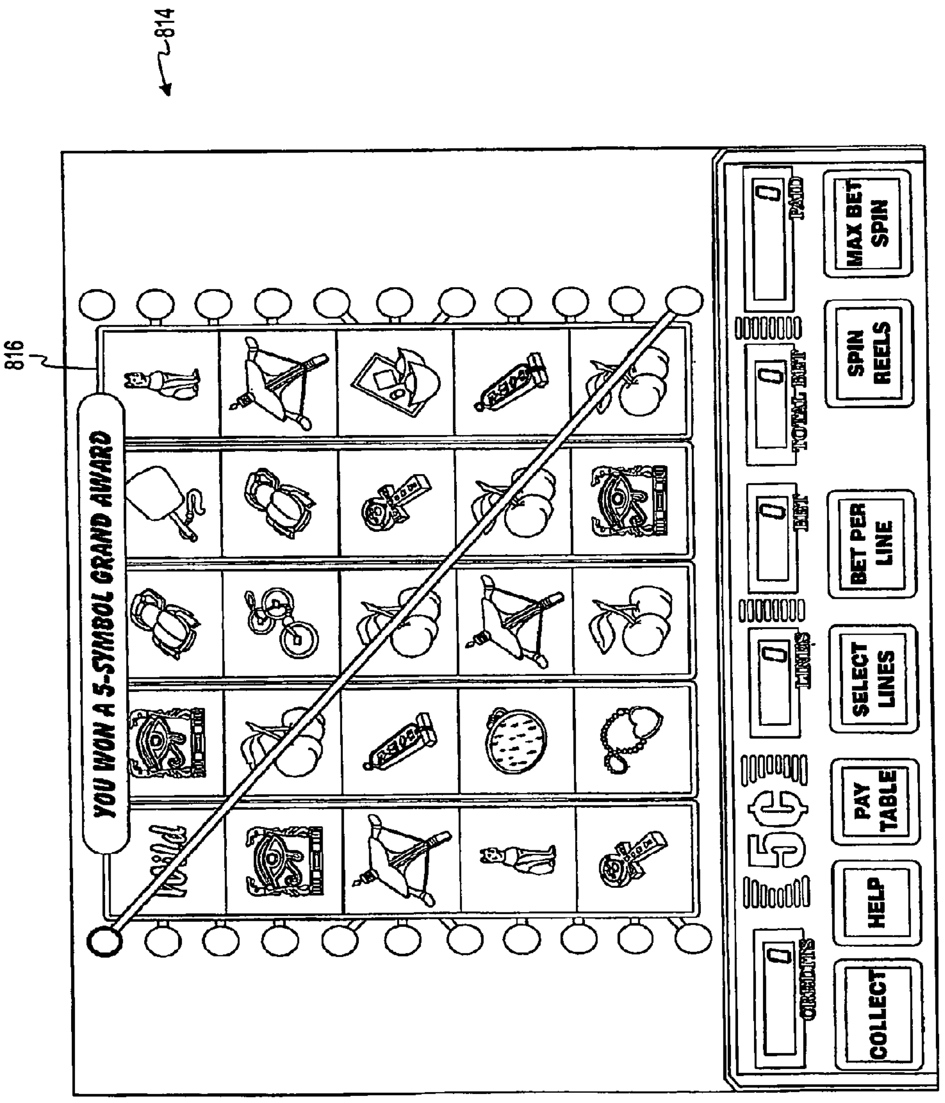
FIG. 8*d* shows the display of FIG. 8*c* in which the rule-change modification is implemented.

Referring to FIGS. 8*a*-8*d*, a display 814 of a gaming machine 800, similar to the gaming machine 10 described above, includes a plurality of reels 816. In FIG. 8*a*, the reels 816 are displayed in motion as they are spinning. In FIG. 8*b*, while the reels 816 are still spinning, a plurality of mystery symbols 818*a*-818*e* are displayed in the display 814. The player is requested to select one of the mystery symbols 818. In FIG. 8*c*, after the player has selected a mystery symbol 818*a* from among the mystery symbols 818*a*-818*e*, a rule-change modification 820 appears in the display 814 (while the reels 816 are still spinning). In FIG. 8*d*, the rule-change modification 820 is implemented when the reels 816 have stopped spinning. Thus, the rule-change modification 820 is based on player input, e.g., player selection. As shown, the player has won a 5-Symbol Grand Award based on four Cherry symbols and the Wild symbol (which was provided by the rule-change modification 820). Accordingly, the present invention contemplates a play-selection to dictate the rule change.

Optionally, the player input is provided in a secondary game to determine which rule-change modification 820 the player will receive. For example, the player rolls a pair of dice to select a trail in which spin features are located on each space of the trial. In another example, the player selects a "gift" that awards a spin feature.

According to an alternative embodiment of the present invention, the rule-change modification is implemented based on player input before the reels have stopped spinning. For example, the rule-change modification is announced before the reels start spinning, the reels start spinning, and, then, the player selects a symbol that changes into a wild symbol. Because the player can see which symbols are aligning, or about to align, along active paylines, the player's anticipation likely increases as he or she attempts to select the best-paying positions for the wild symbol.

Optionally, the rule-change modification includes a first feature that is implemented before or during the reel spin and a second feature that is implemented subsequent to the implementation of the first feature, e.g., after the reels stopped spinning. For example, an announcement indicates to the player before or while the reels are spinning that a rule-change modification has occurred and includes a set of free spins (as the first feature) and an award multiplier (as the second feature), which is selected after playing the free spins. Thus, the free spins are likely more exciting because the player knows that there is a potential for selecting a large multiplier after playing the spins.

Other rule-change modifications are contemplated in alternative embodiments of the present invention. For example, the rule-change modification is a "Scattermania" spin during which a few reel symbols are changed to scatter symbols. In another example, the rule-change modification includes a scatter pay that increases on subsequent reels. In other words, the scatter pay symbol produces a different award depending on the reel. For example, a first reel is associated with awards in the range of 5-1000 credits, a second reel is associated with awards in the range of 100-1000 credits, and a third reel is associated with awards in the range of 200-1000 credits. The scatter pays increase from a minimum of five credits in the first reel to a minimum of 200 credits in the third reel. The reels stop in sequence (i.e., the first reel stops first, the second reel stops second, and the third reel stops last) to increase player anticipation such that the player roots for additional, and larger, scatter pays each time a respective reel stops spinning.

In yet another example, the rule-change modification is a super-scatter spin. The super scatter spin changes all pays to scatter pays or, alternatively, changes only certain symbols to scatter pays. For example, a winning combination that requires three matching symbols aligned along a payline is now a scatter pay by paying if the three matching symbols land adjacent to the payline. The super-scatter spin can be randomly selected or it can be selected by the player. If the super-scatter spin is selected by the player, the super-scatter spin selection can be directly revealed to the player (e.g., the player is required to select a super-scatter spin rule-change modification) or it can be revealed after the player picks a mystery symbol (e.g., the player is unaware of the super scatter spin until after he or she has picked the mystery symbol).

Another rule-change modification is an award of a free subsequent spin. For example, the player is notified while the reels are spinning that he or she will receive a free subsequent spin after the reels stop spinning. Alternatively, the player receives a free second screen bonus such as a mystery bonus. For example, the player is notified while the reels are spinning that he or she will select one or more mystery symbols after the reels stop spinning. While the reels are spinning, the player is aware that a rule-change modification has occurred. However, the rule-change modification is revealed after the reels stop spinning. If the player selects a winning mystery symbol, the player receives an additional or enhanced award. Optionally, the rule-change modification is a hold option that the player can use to hold a symbol or feature for a number of spins or for a period of time. For example, if the player receives a wild symbol during a first spin the player is notified that he or she has obtained a hold feature that will allow the player to hold any wild symbols in their respective positions for ten subsequent spins. Optionally, the hold feature remains active until a some other feature randomly turns the hold feature off.

Yet another rule-change modification is a payline having a particular award multiplier. For example, as the reels are spinning the player is notified that one or more paylines now pays at a 3× multiplier. The modified paylines can be randomly selected or can be selected by the player during the spin. The modified paylines can include only active paylines (i.e., paylines on which the player has already placed a wager) or can include all paylines regardless of whether the paylines are active. If the modified paylines include paylines that are not active, the player is provided with an opportunity to place a wager on the modified paylines that are not active.

The rule-change modification can also be a symbol upgrade. For example, the player is notified that all cherry symbols, which pay at a lower credit amount, will be upgraded to orange symbols, which pay at a higher credit amount, when the reels stop spinning.

In another example, a rule-change modification is indicated using an animation. For example, a TOP GUN® game displays a number of randomly selected airplanes that fly over the reels while the reels are spinning. The flying airplanes indicated that a rule-change modification has occurred. The number of the airplanes indicates, for example, a particular multiplier that will be provided after the reels stop spinning (e.g., three planes indicate a 3× multiplier, four planes indicate a 4× multiplier, etc.).

Alternatively, the player can receive a rule-change modification in which the player can respin one or more reels. For example, the player is notified while the reels are spinning that two reels can be respun at the player's discretion. If the player is not satisfied with the symbol combination that has landed on the reels, the player can respin two reels so that he or she will likely receive a better symbol combination.

The player can, optionally, receive an initial credit award before spinning the reels. Any win that the player may receive based on the spin is multiplied by the initial credit award. The player is likely pleasantly surprised because he or she receives the initial (unexpected) credit award and because the initial credit award may be increased at the end of the spin.

Another rule-change modification includes providing a "free" symbol that changes a bonus-triggering symbol combination. For example, the "free" symbol changes a bonus-trigger symbol combination from a three-symbol combination to a two-symbol combination. Thus, because the player has already been provided with a "free" bonus-trigger symbol, the player only needs two of the three normally required symbols for activating the bonus round.

In an alternative way to indicate rule-change modifications, a display feature, such as a helper character, notifies the player of a rule-change modification, but does not reveal the rule-change modification until the reels stop spinning. Thus, the rule-change modification is a mystery modification revealed by the helper character when the reels stop spinning. For example, after the reels stop spinning, the helper character notifies the player that a particular symbol has triggered a progressive game. In another example, the rule-change modification indicates to the player that particular symbols will trigger respective bonus games, progressive games, etc.

Although the above embodiments refer generally to a spinning motion of the reels (e.g., spinning of mechanical reels and simulated spinning of video reels), alternative embodiments can include a symbol array in which the symbols are revealed in other ways. For example, the symbols can be revealed by providing initially a blurred image of each symbol that, ultimately, becomes a clear, focused, image of the symbol.

Each of these embodiments and obvious variations thereof is contemplated as falling within the spirit and scope of the claimed invention, which is set forth in the following claims.

What is claimed is:

1. A gaming system configured to conduct a wagering game, the gaming system comprising:

one or more input devices;

one or more display devices;

one or more processors; and one or more memory devices storing instructions that, when executed by at least one of the one or more processors, cause the gaming system to:

receive, via at least one of the one or more input devices, an input indicative of a wager, display, via at least one of the one or more display devices, a plurality of spinning reels, the spinning reels stopping to indicate a randomly selected outcome of a plurality of outcomes, conduct the wagering game in accordance with a basic set of gaming rules, display, via at least one of the one or more display devices, an indication of a modification to a player during a spinning motion of the spinning reels, randomly select the modification from a plurality of different types of modifications, the indication of the modification being displayed to the player only during the spinning motion of the spinning reels and after being randomly selected from the plurality of different types of modifications, and apply the modification to the basic set of gaming rules.

2. The gaming system of claim 1, wherein the modification changes a number of positions in a symbol array populated by the plurality of spinning reels.

3. The gaming system of claim 1, wherein the modification is selected from a group consisting of changing a basic position to a wild position, changing a basic position to a wild position and a multiplier, changing a basic symbol to a wild symbol, changing a basic symbol to a wild symbol and a multiplier, changing a basic reel to a wild reel, increasing all wins by a multiplier, increasing a predetermined symbol combination by a multiplier, awarding a bonus for a predetermined symbol combination, increasing a number of paylines, adding right-to-left paylines, and changing the number of reels of the plurality of spinning reels.

4. A gaming system comprising:

one or more input devices;

one or more display devices;

one or more processors;

one or more memory devices storing instructions that, when executed by at least one of the one or more processors, cause the gaming system to:

receive, via at least one of the one or more input devices, an input indicative of a wager;

display, via at least one of the one or more display devices, a plurality of spinning reels stopping to indicate a randomly selected outcome of a plurality of outcomes;

conduct a wagering game having a basic set of gaming rules;

display, via at least one of the one or more display devices, an indication of a modification to the player after receiving the input indicative of the wager and prior to stopping the spinning reels;

randomly select the modification from a plurality of different types of modifications, the indication of the modification being displayed to the player only after the plurality of spinning reels has been displayed, and only after the modification has been randomly selected from the plurality of different types of modifications;

apply the modification to the basic set of gaming rules, the modification of the basic set of gaming rules creating a modified rule set; and conduct the remainder of the wagering game with the modified rule set.

5. The gaming system of claim 4, wherein the one or more memory devices further store instructions that, when executed by at least one of the one or more processors, cause the gaming system to:

select a second modification from the plurality of different types of modifications;

apply the second modification to the modified rule set to create a further-modified rule set; and conduct the remainder of the wagering game with the further-modified rule set.

6. The gaming system of claim 4, wherein the basic set of gaming rules is used to conduct a subsequent wagering game in response to a subsequent indication of a wager input being received via at least one of the one or more input devices.

7. The gaming system of claim 4, wherein the modification changes a number of positions in a symbol array populated by the plurality of spinning reels.

8. The gaming system of claim 4, wherein the modification is selected from a group consisting of changing a basic position to a wild position, changing a basic position to a wild position and a multiplier, changing a basic symbol to a wild symbol, changing a basic symbol to a wild symbol and a multiplier, changing a basic reel to a wild reel, increasing all wins by a multiplier, increasing a predetermined symbol combination by a multiplier, awarding a bonus for a predetermined symbol combination, increasing a number of paylines, adding right-to-left paylines, and changing the number of reels of the plurality of spinning reels.

9. A computer-implemented method of conducting wagering games on a wagering game system, the wagering game system including one or more input devices, one or more display devices, and one or more processors, the method comprising:

receiving, via at least one of the one or more input devices, a wager to initiate a wagering game on the wagering game system;

randomly selecting, via at least one of the one or more processors, a game outcome from a plurality of game outcomes;

displaying, via at least one of the one or more display devices, a plurality of spinning reels, the spinning reels stopping to indicate the randomly selected game outcome;

conducting, via at least one of the one or more processors, the wagering game in accordance with a basic set of gaming rules;

displaying, via at least one of the one or more display devices, an indication of a modification to a player during a spinning motion of the spinning reels;

randomly selecting the modification from a plurality of different types of modifications, the indication of the modification being displayed to the player only during the spinning motion of the spinning reels and after being randomly selected from the plurality of different types of modifications; and applying the modification to the basic set of gaming rules.

10. The computer-implemented method of claim 9, wherein the modification includes changing, via at least one of the one or more processors, a number of positions in a symbol array populated by the plurality of spinning reels.

11. The computer-implemented method of claim 9, wherein the modification is selected from a group consisting of changing a basic position to a wild position, changing a basic position to a wild position and a multiplier, changing a basic symbol to a wild symbol, changing a basic symbol to a wild symbol and a multiplier, changing a basic reel to a wild reel, increasing all wins by a multiplier, increasing a predetermined symbol combination by a multiplier, awarding a bonus for a predetermined symbol combination, increasing a number of paylines, adding right-to-left paylines, and changing the number of reels of the plurality of spinning reels.

12. The computer-implemented method of claim 9, further comprising:

creating, via at least one of the one or more processors, a modified rule set in response to applying the modification to the basic set of gaming rules;

selecting a second modification from the plurality of different types of modifications;

applying, via at least one of the one or more processors, the second modification to the modified rule set to create a further-modified rule set; and conducting, via at least one of the one or more processors, the remainder of the wagering game with the further-modified rule set.

13. The computer-implemented method of claim 9, further comprising using the basic set of gaming rules for conducting a subsequent wagering game in response to a subsequent indication of a wager input being received via at least one of the one or more input devices.

* * * * *

UNITED STATES PATENT AND TRADEMARK OFFICE

CERTIFICATE OF CORRECTION

PATENT NO. : 8,814,657 B2
APPLICATION NO. : 13/593086
DATED : August 26, 2014
INVENTOR(S) : Allon G. Englman et al.

It is certified that error appears in the above-identified patent and that said Letters Patent is hereby corrected as shown below:

In the Claims

On Column 15, Line 45 (Claim 1, Line 22), please insert --after-- after “only”;

On Column 15, Line 45-46 (Claim 1, Line 22-23), please delete “during the spinning motion of”;

On Column 15, Line 46 (Claim 1, Line 23), please insert --plurality of-- between “the” and “spinning reels”;

On Column 15, Line 46 (Claim 1, Line 23), please insert --has been displayed-- after “reels”;

On Column 15, Line 46 (Claim 1, Line 23), please insert --only-- before “after”;

On Column 15, Line 46-47 (Claim 1, Line 23-24), please insert --the modification has been-- after “after”;

On Column 15, Line 47 (Claim 1, Line 24), please delete “being”;

On Column 16, Line 20 (Claim 4, Line 23), please delete the “,” after “displayed”;

On Column 17, Line 13 (Claim 9, Line 24), please insert --after-- after “only”;

On Column 17, Line 13-14 (Claim 9, Line 24-25), please delete “during the spinning motion of”;

On Column 17, Line 14 (Claim 9, Line 25), please insert --plurality of-- between “the” and “spinning reels”;

On Column 17, Line 14 (Claim 9, Line 25), please insert --has been displayed-- after “reels”;

Signed and Sealed this
Twenty-fifth Day of August, 2015

Michelle K. Lee
*Director of the United States Patent and Trademark Office*

On Column 17, Line 14 (Claim 9, Line 25), please insert --only-- before “after”;

On Column 17, Line 14 (Claim 9, Line 25), please insert --the modification has been-- after “after”;

On Column 17, Line 14 (Claim 9, Line 25), please delete “being”.